(12) United States Patent
Noutoshi et al.

(10) Patent No.: US 8,625,031 B2
(45) Date of Patent: Jan. 7, 2014

(54) VIDEO DISPLAY DEVICE

(75) Inventors: Tomoharu Noutoshi, Osaka (JP); Takashi Kanda, Osaka (JP); Toshiyuki Fujine, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/978,194

(22) PCT Filed: Nov. 29, 2011

(86) PCT No.: PCT/JP2011/077518
§ 371 (c)(1),
(2), (4) Date: Jul. 3, 2013

(87) PCT Pub. No.: WO2012/105117
PCT Pub. Date: Aug. 9, 2012

(65) Prior Publication Data
US 2013/0278830 A1    Oct. 24, 2013

(30) Foreign Application Priority Data

Jan. 31, 2011 (JP) ................................ 2011-017710
Apr. 1, 2011 (JP) ................................ 2011-081389

(51) Int. Cl.
- *H04N 5/14* (2006.01)
- *H04N 5/21* (2006.01)
- *G06K 9/36* (2006.01)
- *G06K 9/00* (2006.01)

(52) U.S. Cl.
USPC ........... 348/630; 348/672; 348/675; 382/167; 382/274

(58) Field of Classification Search
USPC ......... 348/241, 242, 252–256, 606, 607, 612, 348/624, 630, 645, 671, 672, 674, 675, 678, 348/679; 382/162, 167–169, 254, 274; 358/518–523, 448, 447, 461; 345/589, 345/690, 600–602, 63, 88, 89
See application file for complete search history.

(56) References Cited

U.S. PATENT DOCUMENTS

| | | | | |
|---|---|---|---|---|
| 5,959,696 | A * | 9/1999 | Hwang | 348/678 |
| 6,373,533 | B1 * | 4/2002 | Kawabata et al. | 348/672 |
| 6,650,774 | B1 * | 11/2003 | Szeliski | 382/169 |

(Continued)

FOREIGN PATENT DOCUMENTS

| | | |
|---|---|---|
| JP | 9-80378 A | 3/1997 |
| JP | 2006-146178 A | 6/2006 |

(Continued)

*Primary Examiner* — Victor Kostak
(74) *Attorney, Agent, or Firm* — Birch, Stewart, Kolasch & Birch, LLP (57) ABSTRACT

A histogram generation portion calculates a prescribed feature value of a pixel and the maximum feature value for the pixel, for each pixel of one frame of an input video signal. Then, the ratio of the feature value of the pixel to the maximum feature value is calculated for each pixel as an index of color brightness, and a histogram generated wherein the numbers of pixels are integrated by index value. An enhancement processing portion applies gain and carries out an enhancement for pixel values wherein the index in the histogram which the histogram generation portion generates is greater than or equal to a prescribed threshold. The feature value is treated as a luminosity (L*) which is defined with CIELAB chroma space. Additionally, the feature value may be data which has the maximum tone value among pixel RGB data, or may be a luminosity value (Y) of the pixel.

7 Claims, 10 Drawing Sheets

(56) References Cited

U.S. PATENT DOCUMENTS

| | | | |
|---|---|---|---|
| 7,133,307 B2* | 11/2006 | Baker | 365/148 |
| 7,158,686 B2* | 1/2007 | Gindele | 382/274 |
| 7,592,996 B2* | 9/2009 | Brown Elliott et al. | 345/102 |
| 7,839,456 B2* | 11/2010 | Sato et al. | 348/674 |
| 8,315,473 B1* | 11/2012 | Tao et al. | 382/260 |
| 2002/0180893 A1* | 12/2002 | Nicolas et al. | 348/672 |
| 2004/0066980 A1* | 4/2004 | Gindele et al. | 382/274 |
| 2006/0082689 A1 | 4/2006 | Moldvai | |
| 2007/0046828 A1* | 3/2007 | Miyazawa | 348/674 |
| 2008/0136835 A1 | 6/2008 | Abe et al. | |
| 2008/0198180 A1 | 8/2008 | Langendijk | |
| 2009/0167956 A1* | 7/2009 | Miyazawa | 348/672 |
| 2009/0244386 A1* | 10/2009 | Norgaard | 348/672 |

FOREIGN PATENT DOCUMENTS

| | | |
|---|---|---|
| JP | 2009-9082 A | 1/2009 |
| JP | 2009-500654 A | 1/2009 |
| JP | 2010-271480 A | 12/2010 |
| WO | WO 2007/004194 A2 | 1/2007 |
| WO | 2010-130399 A | 6/2010 |

\* cited by examiner

VIDEO DISPLAY DEVICE

TECHNICAL FIELD

The present invention relates to a video display device, and more particularly to a video display device provided with an enhancement function for improving image quality of a displayed video.

BACKGROUND OF THE INVENTION

In a video display device, an enhancement function for improving image quality of a displayed video is known. In a case where the enhancement function is executed, generally, when a maximum value of a tone is detected for each frame of a video signal and the level of the maximum value is low, gain is applied to a video signal in a part with a high tone for emphasis. In addition, when a minimum value of atone of a video signal is detected and the minimum value is high, compression gain is applied to a video signal in a part with a low tone to lower the tone. Such an enhancement function is used, so that a signal range of a video signal is broadened and contrast feeling of a displayed image is increased, thus improving image quality.

For example, Patent Document 1 discloses a liquid crystal display device automatically controlling contrast so that, along with the adjustment of luminance of a backlight, brightness/darkness of an image also comes close to the state before the adjustment. In this liquid crystal display device, an operator turns on/off a light source of a backlight device, thereby allowing to change luminance of an image and aim for power saving, an enhancement function works when the luminance is changed, contrast of a displayed image is controlled to be suited to the luminance, and even though the luminance of the backlight device is lowered, it is possible to obtain almost same level of brightness/darkness of the image as before the luminance is lowered.

PRIOR ART DOCUMENT

Patent Documents

Patent Document 1: Japanese Laid-Open Patent Publication No. 9-80378

SUMMARY OF THE INVENTION

Problem to be Solved by the Invention

In a conventional enhancement function, processing is performed such that a maximum value or a minimum value of a pixel value of a video signal is checked to emphasize and raise a high part of a tone or compress and reduce a low part of a tone. Such enhancement processing is performed by checking a pixel value of an image, thus does not necessarily improve video quality sufficiently to be coincident with a human visual performance. For example, among object colors at the time of shooting various objects, there exists a color which is luminous in appearance although luminance thereof is low as a video signal.

In addition, in the case of considering on an xy chromaticity diagram, it is possible to represent all colors by chromaticity identified on a two-dimensional plane by x and y, and Y indicating lightness in a vertical direction to the two-dimensional plane. In a case where a color from an object is only reflected light, the lightness Y at each chromaticity is limited up to an identified value. A maximum of lightness at the time is a maximum lightness. Only with the reflected light, an upper limit of lightness of each chromaticity is the maximum lightness while in a case where an object itself is emitting light, lightness is allowed to have a value which is greater than or equal to the maximum lightness. A color having the lightness which is greater than or equal to the maximum lightness is generally referred to as a luminescent color. It is generally difficult to represent the luminescent color on a video signal.

That is, there is sometimes a gap between a value of a video signal, and what is seen and felt. When an enhancement is carried out by detecting a color which looks bright by human eyes, it is possible to obtain an effect of further highlighting a color which is luminous on a screen to improve image quality, however, enhancement processing based on such an idea has not been conventionally performed.

The present invention has been devised in view of circumstances as described above and aims to provide a video display device capable of improving video quality in a state more suited to a human visual performance by focusing on color brightness of a video signal and performing enhancement processing for emphasizing and highlighting a bright color more.

Means for Solving the Problem

To solve the above problems, a first technical means of the present invention is a video display device for enhancing and displaying an input video signal based on a feature value of the input video signal, comprising: a histogram generation portion for generating a histogram of the feature value of the input video signal; and an enhancement processing portion for regarding a top region in a prescribed range of the histogram generated by the histogram generation portion as a luminescent color and enhancing a pixel value of the luminescent color; and a compression gain processing portion for uniformly decreasing gain over the entire pixels of one frame subjected to enhancement processing after the enhancement processing portion performs the enhancement processing, wherein the histogram generation portion calculates, for each pixel of one frame of an input video signal, the feature value of a pixel and a possible maximum of the feature value of the pixel, calculates, for each pixel, a ratio of the feature value of the pixel to the maximum of the feature value as an index value of color brightness, and generates a histogram in which the number of pixels is integrated according to the index value, the enhancement processing portion regards a pixel in which the index value in the histogram generated by the histogram generation portion is greater than or equal to a prescribed threshold as the top region and carries out an enhancement by giving gain-up for a pixel value in the top region, the enhancement processing portion integrates, at the time of enhancing the pixel which is greater than or equal to the threshold, the number of pixels from a pixel having a highest feature value in a direction of low feature value of the histogram, applies gain-up in which the M-th (M is a prescribed value) percentile pixel of the total number of pixels is displayed in a displayable highest tone, and temporarily permits that the pixel value exceeds the displayable highest tone by the applied gain-up, and the compression gain processing portion performs, in a case where the pixel value exceeds the displayable highest tone even after the compression gain processing portion applies gain-down for the temporarily permitted pixel value, soft clip so that the pixel exceeding the highest tone is output in a tone within the highest tone as well as that an output value in a region from the highest tone up to a prescribed low tone gradually lowers in a curve.

A second technical means is the video display device of the first technical means, wherein the enhancement processing portion determines, the threshold 'thresh' by 'thresh'=A+Nσ (N is a constant) where the prescribed threshold is a 'thresh', an average value of the index value of the histogram is A, and a standard deviation is σ.gram is A, and a standard deviation is σ.

A third technical means is the video display device of the first technical means, wherein the enhancement processing portion exponentiates a logarithmic average of a luminance value of a pixel of one frame of an input video signal to calculate a geometric average value, and carries out the enhancement by the gain-up in a case where the calculated geometric average value is lower than a prescribed value.

A fourth technical means is the video display device of the third technical means, wherein the enhancement processing portion sets a second prescribed value which is lower than the prescribed value of the geometric average value, gradually increases gain which is applied as the enhancement in order from the prescribed value up to the second prescribed value in a region from the prescribed value to the second prescribed value, and keeps the gain constant in a region where the geometric average value is lower than the second prescribed value.

A fifth technical means is the video display device of the first technical means, wherein the feature value of the pixel is luminance L* which is specified by CIELAB color space.

A sixth technical means is the video display device of the first technical means, wherein the feature value of the pixel is data including a maximum tone value among pixel RGB data.

A seventh technical means is the video display device of the first technical means, wherein the feature value of the pixel is a luminance value Y of a pixel.

Effect of the Invention

According to the video display device of the present invention, it is possible to improve video quality in a state more suited to a human visual performance by focusing on color brightness of a video signal and performing enhancement processing for emphasizing and highlighting a bright color more.

PREFERRED EMBODIMENTS OF THE INVENTION

Figure 1:
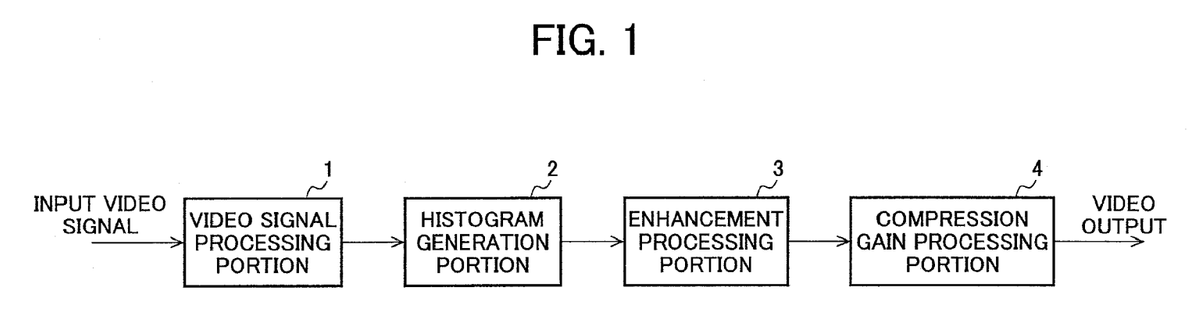
FIG. 1 is a block diagram showing a partial configuration example of a video display device according to the present invention.

FIG. 1 is a block diagram showing a partial configuration example of a video display device according to the present invention, where provided area video signal processing portion 1, a histogram generation portion 2, an enhancement processing portion 3 and a compression gain processing portion 4. The video display device includes, other than these components, a not shown display portion such as a liquid crystal panel, a backlight for illuminating the display portion and the like. In the video display device, signal processing for an audio signal and output processing to a speaker and an audio output terminal are also performed.

The video signal processing portion 1 performs video signal processing as with conventional processing for inputting a video signal separated from a broadcast signal and a video signal input from an external device. For example, I/P conversion, noise reduction, scaling processing, γ adjustment, white balance adjustment and the like are appropriately executed. Moreover, contrast, a color tone and the like are controlled based on a user setting value.

A video subjected to signal processing is input to the histogram generation portion 2 to create a histogram for each frame. The histogram generation portion 2 calculates, for each pixel of one frame of the input video signal, a prescribed feature value related to color brightness of an input video signal and a possible maximum feature value of each pixel while holding chromaticity, and calculates for each pixel a ratio of a feature value of the pixel to the maximum feature value as an index value of color brightness. Then, a histogram is generated in which the number of pixels is integrated according to the index value. The above-described prescribed feature value is luminance L* specified by CIELAB color space. Further, in another example, the above-described feature value is data including a maximum tone value among pixel RGB data. In still another example, the above-described feature value is a luminance value Y of a pixel.

The enhancement processing portion 3 applies gain (increases gain) and carries out an enhancement for a tone of a pixel that is regarded as a luminescent color. The enhancement processing portion 3 calculates a threshold based on an average value A of the above-described index value of the histogram and a standard deviation σ, and applies gain and carries out an enhancement for a pixel value of a pixel having the above-described index value which is greater than or equal to a threshold.

Further, the enhancement processing portion 3 raises a logarithmic average of a luminance value of a pixel of one frame of the input video signal to calculate a geometric average value, and carries out an enhancement by applying gain in a case where the calculated geometric average value is lower than a prescribed value.

The enhanced video signal is input to the compression gain processing portion 4. After the enhancement processing portion 3 performs enhancement processing, the compression gain processing portion 4 uniformly applies compression gain (decreases gain) over the entire pixels of one frame subjected to enhancement processing. A compression amount is decided according to prescribed conditions of screen average luminance and the like.

In an embodiment of a liquid crystal display device according to the present invention, a luminescent color is detected from a video signal to perform enhancement processing for the detected luminescent color. The luminescent color refers to a color with a prescribed level or more of brightness on a lightness axis in a color represented on a chromaticity diagram, and the enhancement processing is performed for a video signal concerning a pixel of a color with a color brightness level which is greater than or equal to a prescribed threshold. The threshold in this case is a relative value that is defined according to a histogram for each image of one frame, and enhancement processing is performed for an image with a relatively prescribed level or more of brightness in images.

Enhancement processing is performed for a luminescent color, so that it is possible to perform enhancement processing for an actually bright color in appearance. Then, for a video with the enhanced luminescent color, compression gain is uniformly applied to lower a tone. Since brightness of the entire screen becomes higher in the case of holding an enhancing state, compression gain is applied again to lower the brightness of the screen. Since enhancement processing is performed for a luminescent color, thereafter applying compression gain to the entire screen, the processing in this case is equal to processing for redistributing luminance on the screen. Such processing allows a part with a high luminescent color to be especially highlighted.

In luminescent color enhancement processing that is executed in the video display device according to the present invention, as described above, a luminescent color is detected from an input video signal to perform enhancement processing for emphasizing a tone for the video signal of the luminescent color. In the processing, first, a geometric average value (GAve) and a CMI (color mode index) histogram are detected from the input video signal. The CMI is one of the feature values for performing enhancement processing according to the present invention.

The geometric average value is not an average of signal luminance but a luminance average value in which an average of luminance of a liquid crystal panel is calculated as a value that is coincident with a visual performance. Further, the CMI histogram is a histogram created based on a video signal and coincident with a human visual performance in which the number of pixels is integrated according to an index indicating color brightness, which is different from a Y histogram or the like in which the number of pixels is integrated according to the luminance value Y of a video signal. Description will be given below for specific definitions and calculation methods of the geometric average value and CMI histogram.

Figure 2:
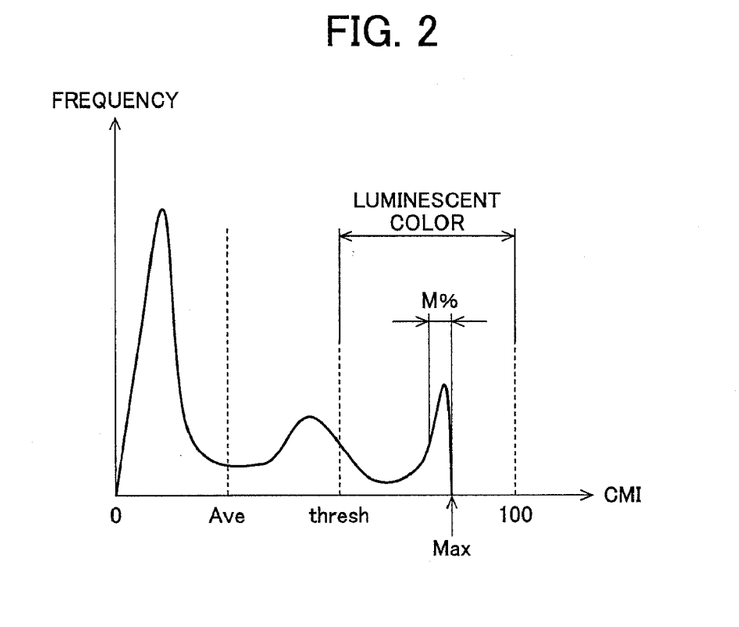
FIG. 2 is a diagram explaining luminescent color enhancement processing that is executed in the video, display device of the present invention.

FIG. 2 is a diagram explaining the luminescent color enhancement processing that is executed in the video display device of the preset invention, showing an example of the CMI histogram that is generated from an input video signal. When the CMI histogram is detected, an average value (Ave) and a standard deviation ($\sigma$) are calculated from the CMI histogram to be used for calculating a threshold, 'thresh', by 'thresh'=$Ave+N\sigma$, where N is a prescribed constant. Other methods including at least identifying the top of the population may also be applied as the calculation method of the threshold.

For example, assuming that the CMI histogram as shown in FIG. 2 is detectable from one frame of an input video signal, a horizontal axis of the CMI histogram is CMI, and indicates the CMI of the brightest color in all colors on a chromaticity diagram as 100. That is, color brightness is different according to tones of video signals, and the CMI is calculated from the tones to integrate the number of pixels. A vertical axis indicates the number of pixels (frequency) integrated by color brightness (CMI).

Additionally, the 'thresh' calculated as described above is applied to the CMI histogram. The 'thresh' is used for determining a luminescent color from the CMI histogram, and a pixel with the CMI that is greater than the 'thresh' is defined as a pixel for displaying a luminescent color.

Then, among pixels with the CMI that is greater than the 'thresh' in the CMI histogram, pixels are accumulated in order from the highest CMI to the lowest CMI to calculate gain for an enhancement so that the CMI of the M-th percentile pixel among all pixels becomes 100. The value of gain thereof is a maximum value of gain (MAX) that is decided according to a geometric average value which will be described next.

Figure 3:
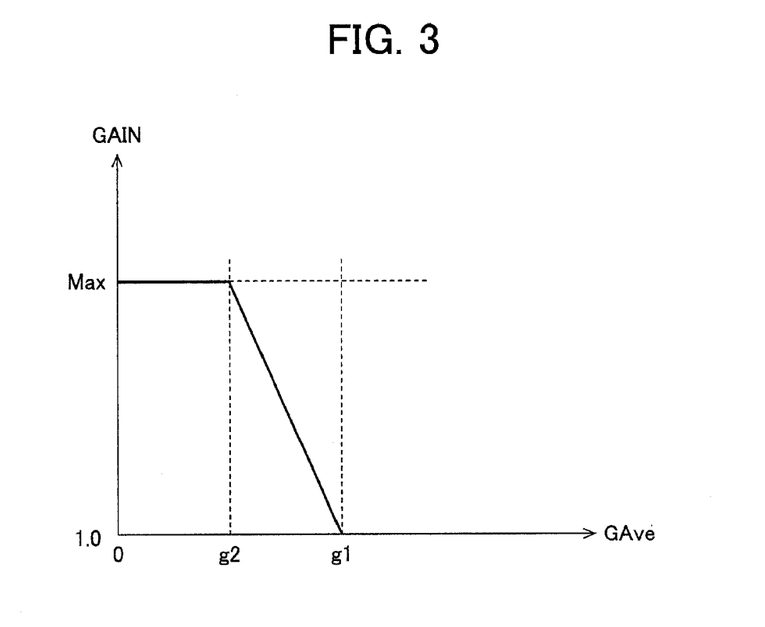
FIG. 3 is a diagram explaining a setting example of gain for performing enhancement processing.

FIG. 3 is a diagram explaining a setting example of gain for performing enhancement processing. Gain that is applied in the luminescent color enhancement processing is calculated using the geometric average value calculated as described above and the maximum value of gain that is calculated based on the M-th percentile pixel from the maximum value of the CMI.

As shown in FIG. 3, in the case of a video having a geometric average value that is greater than or equal to a first value g1 of a predetermined geometric average value (GAve), an enhancement is not carried out for the video (frame). A video with a high geometric average value is a video which is entirely bright, and when this video is compressed again after carrying out an enhancement, an impression that a screen becomes dark by compression is greater than an impression that a luminescent color is highlighted by an enhancement. Thus, an enhancement is not carried out for the video having the geometric average value that is greater than or equal to a prescribed level of the geometric average value g1. That is, gain=1.0.

Moreover, between a first geometric average value g1 and a second geometric average value g1 that is lower than the former, gain is gradually increased in order from g1 to g2 from 1.0 up to the maximum value. The maximum value of gain (MAX) is a value calculated so that the above-described CMI of the M-th percentile pixel becomes 100.

In a case where the geometric average value is smaller than g2, gain with which the CMI of the M-th percentile pixel becomes 100 is applied. At the time, a pixel with the CMI larger than that of the M-th percentile pixel may have the CMI that is larger than 100 as a result of application of gain. In this case, the pixel with the CMI that is larger than 100 is subjected to clipping in actual display, thus causing crush, thereby allowing no half-toning.

In this case, since the brightest level of a pixel is originally illuminated with a high tone, it is less important to finely represent a tone. On the other hand, for example, in the case of calculating gain based on the highest value of the CMI, it is possible to perform half-toning for all pixels, however, a pixel having a specifically high CMI in a video influences gain, and thus the gain has substantially little effect in some cases. In the case of not allowing a certain level of gain to be applied, a subsequent compression amount becomes small, and it is impossible to sufficiently attain an object of the present invention that a luminescent color is enhanced to increase image quality. Thus, gain calculation is performed so as to allow crush of pixels up to the M-th percentile in order to secure a certain amount of gain. However, because of also having pixels with the CMI that is lowered again by applying compression gain after carrying out an enhancement by applying gain, all pixels with the CMI which are larger than M-th percentile are not necessarily subjected to clipping. Moreover, in actual processing, for an area which is crushed after compression, processing is performed for holding a tone as far as possible by performing soft clip processing described below.

Figure 4:
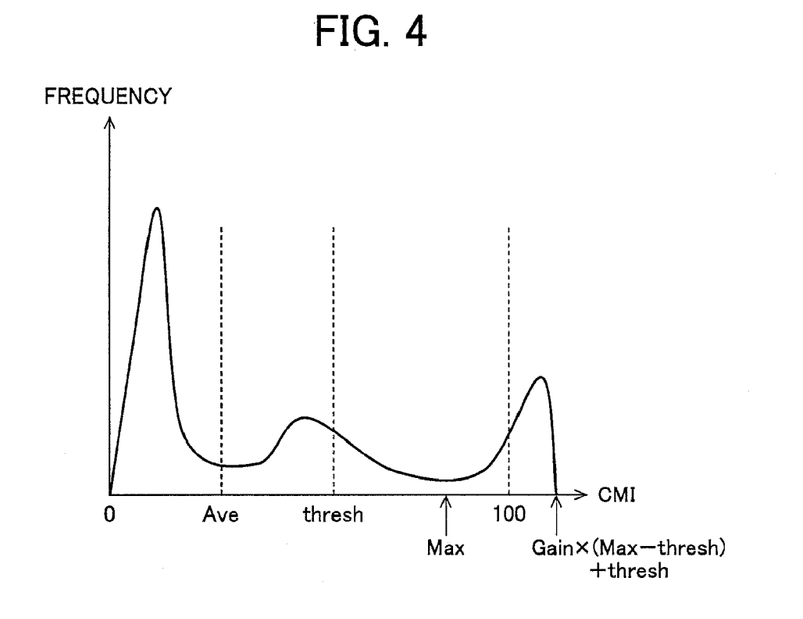
FIG. 4 is a diagram showing a state where a CMI histogram in FIG. 2 is enhanced using calculated gain.

FIG. 4 is a diagram showing a state where the CMI histogram in FIG. 2 is enhanced using the gain calculated as described above. When gain for an enhancement is calculated in the above-described processing, the gain is applied to carry out an enhancement. A target pixel for carrying out an enhancement is a pixel with the CMI which is greater than or equal to the 'thresh', and enhanced by applying gain to a luminance L* component in the CIELAB color space of the pixel. Thereafter, the color space is returned to RGB color space. The amount of gain is calculated based on the geometric average value of a video and maximum gain based on the CMI. That is, based on the 'thresh' calculated from the CMI histogram, a pixel of a bright color is emphasized by carrying out an enhancement, while a pixel of a dark color is kept as-is.

At the time, in the state with the enhancement in FIG. 4, a pixel with CMI exceeding 100 also is not clipped and kept allowed. The value with CMI exceeding 100 is a value exceeding 255 of a tone value represented with eight bits, for example, and thus is not allowed to be represented on a screen, however, at this time point, the CMI exceeding 100 is allowed because it is considered that there is a pixel with the CMI lowered again since compression gain is applied to the entire video at next processing. The highest value of the CMI at the time of enhancement is obtained by gain $X$(Max−'thresh')+'thresh'.

Subsequently, in the state where the luminescent color is enhanced as shown in FIG. 4, the entire video signal is compressed. The compression gain is uniformly applied to pixels of the entire screen. Accordingly, the luminescent color is emphasized more than pixels of other non-luminescent colors by an effect of the enhancement and a luminescent color part is allowed to be highlighted. That is, this processing is equal to redistribution of luminance on a screen. Moreover, an amount of gain is changed according to a geometric average value and an enhancement is not carried out in a bright image, thus inhibiting the entire screen from becoming dark by compressing the bright image after the enhancement thereof.

The amount of the compression gain is defined based on prescribed conditions specifying brightness of a screen and the like. For example, when display is performed only by carrying out an enhancement, a screen average picture level (APL) of a video signal is increased. This is returned to an original APL level by the compression gain, the APL of the entire screen is thereby maintained, and in addition, it is possible to redistribute luminance so as to highlight the luminescent color by carrying out the enhancement to compression gain processing. Moreover, relation between gain at the time of the enhancement and the compression gain may be defined in advance.

Figure 5:
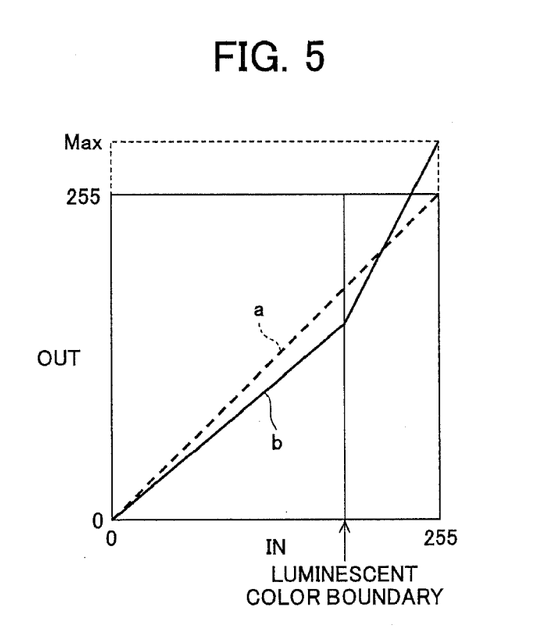
FIG. 5 is a diagram showing an example of a state before and after carrying out an enhancement with a tone curve.

FIG. 5 is a diagram showing an example of a state before and after carrying out the enhancement to the compression processing with a tone curve. As described above, in the embodiment according to the present invention, a pixel with the CMI which is greater than or equal to the 'thresh' is regarded as a luminescent color, and an enhancement is carried out for the pixel. The enhancement is carried out for L* in CIELAB color space and then returned to RGB data. Subsequently, the compression gain is applied to the entire video.

The tone curve shown in FIG. 5 shows tone characteristics of input and output of the RGB data, and is displayed with 0 to 255 tones with eight bits. Additionally, symbol 'a' indicates a state before the enhancement while symbol 'b' indicates a state after the enhancement and compression processing. A luminescent color boundary is a tone corresponding to a 'thresh' of a CMI, atone curve is more greatly inclined due to the enhancement in a tone which is greater than or equal to the luminescent color boundary, and an output tone exceeds 255 in the vicinity of the highest tone (255). This is because a CMI greater than 1.0 is allowed without being clipped even in a case where a CMI becomes greater than CMI 100 at the time of the enhancement as shown in FIG. 4. Even after the compression gain is applied thereto, the output tone exceeds 255 in some cases.

Figure 6:
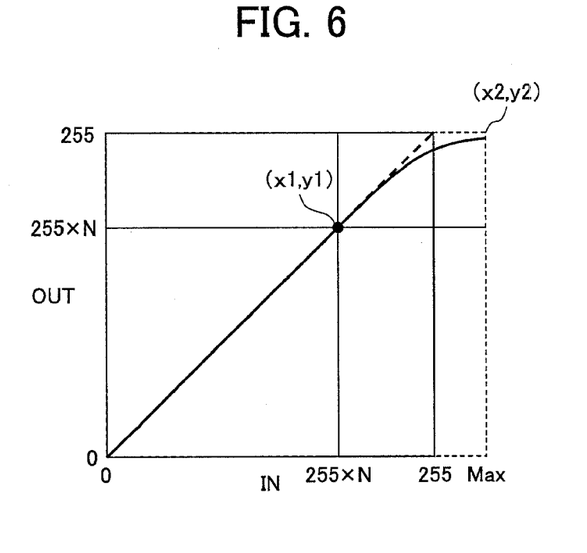
FIG. 6 is a diagram showing a tone curve with RGBLUT created from RGB data shown by the tone curve in FIG. 5.

FIG. 6 is a diagram showing a tone curve with an RGBLUT created from RGB data shown by the tone curve in FIG. 5. In the diagram, a MAX output tone is detected from data after compression of FIG. 5. Then, the RGBLUT so as to output a 255 tone when a tone signal as with the MAX output tone is input is created. At the time, the LUT is such that relation between input and output is linear as far as output is 0 to 255×N % (N is a prescribed constant). A quadratic function $Y(x)=A+B \times (x-x1)+C \times (x-x1)2$ passing through $(x1, y1)=(255 \times N, 255 \times N)$ and $(x2, y2)=(MAX, 255)$ is then calculated. Conditions thereof are based on (1) y(x1)=y1 (linear LUT and coordinates are continuous), (2) y'(x1)=y1/x1 (linear LUT and an inclination are continuous), and (3) y(x2)=y2 (initial conditions). An obtained tone curve c is, as shown in FIG. 6, formed such that relation is linear where input and output have the same values as far as input is 0 to 255×N %, an inclination is changed when input is greater than or equal to 255×N %, and output is 255 when input is MAX.

Figure 7:
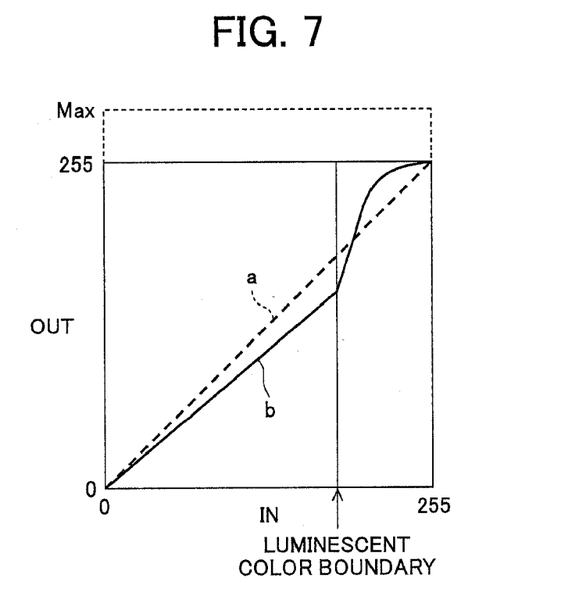
FIG. 7 is a diagram showing a tone curve in a case where output of the tone curve in FIG. 5 is used as input in FIG. 6.

FIG. 7 is a diagram showing a tone curve (b) in a case where output of the tone curve (b) in FIG. 5 is used as input in FIG. 6. Accordingly, in a tone which is greater than or equal to the luminescent color boundary, a tone curve in a curved shape is formed toward (x, y)=(255, 255) so that an output value does not exceed 255, thereby performing clip softly to keep a tone as far as possible and reducing a sense of discomfort on display. Note that, the above-described processing may be executed by operation processing of software without using an LUT in which an output value for input is prepared in advance.

As described above, in the luminescent color enhancement processing according to the present invention, a luminescent color which is a bright color is detected from a CMI histogram of a video signal, and the luminescent color is enhanced when a geometric average value of the video signal is smaller than a prescribed value, that is, a video is dark. The video signal after the enhancement is then compressed to redistribute luminance. This makes it possible to perform high-quality video display by highlighting a part in a luminescent color. The effect of the enhancement is great especially in a video with a dark input video. Moreover, in a video having many luminescent color regions as well as many parts in which a tone is saturated, it is possible to avoid that a screen looks dark due to compression processing after the enhancement by not carrying out a luminescent color enhancement.

(CMI Detection Processing)

Next, description will be specifically given for detection processing of the CMI which is used in the above-described luminescent color enhancement processing.

As described above, a CMI (Color Mode Index) is an index showing to what extent a color of interest is bright. Here, the CMI is different from luminance and shows brightness to which information of a color is added. The CMI is defined by $$L*/L*\text{modeboundary} \times 100 \quad \text{formula (1)}.$$

Figure 8:
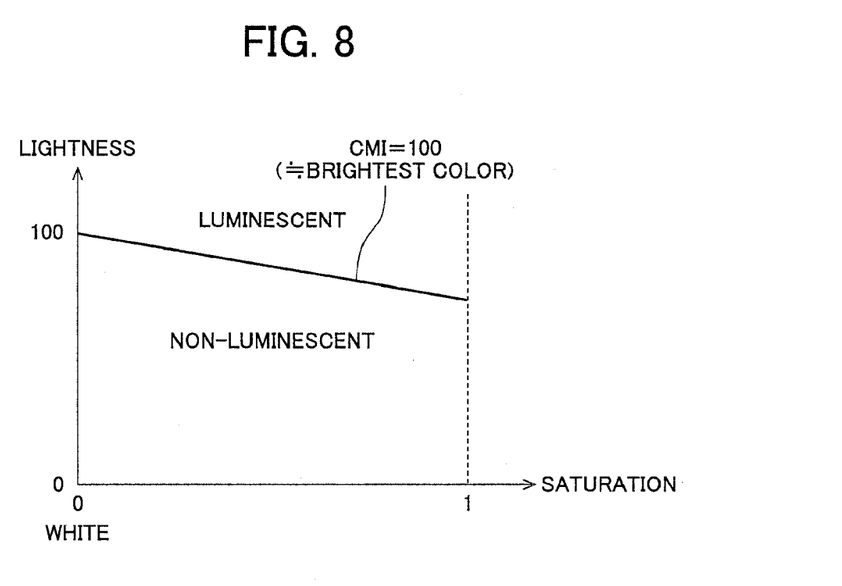
FIG. 8 is a diagram schematically showing a luminescent color boundary where CMI=100 in relation between saturation and lightness.

The above-described $L*$ is an index of relative color brightness, and becomes lightness of white which is the brightest as an object color when $L*=100$. In the above-described formula (1), $L*$ is lightness of a color of interest, while $L*$modeboundary is lightness of a boundary which looks like emitting light in chromaticity as with the color of interest. Here, it is known that $L*$modeboundary≈lightness of an optimal color (brightest color among object colors). Lightness of a color in which CMI=100 is referred to as a luminescent color boundary, and it is defined as emitting light (being a luminescent color) in the case of exceeding CMI=100. The luminescent color boundary where CMI=100 in relation between saturation and lightness is schematically shown in FIG. 8.

In the real world, objects with brightness exceeding that of the brightest object color (optimal color) (objects emitting light) exist and are allowed to be seen by a human. That is, there exist many colors in which CMI>100. Here, for a broadcast signal or image data, a luminance range is compressed by a stop of a camera or the like at the time of shooting, and moreover, standardized and made into data in a color gamut according to standards such as NTSC or EBU. Accordingly, even a reflected color or a luminescent color is standardized, so that a video signal is in a state of having no color in which the CMI exceeds 100 (that is, exceeding lightness of the optimal color).

Figure 9:
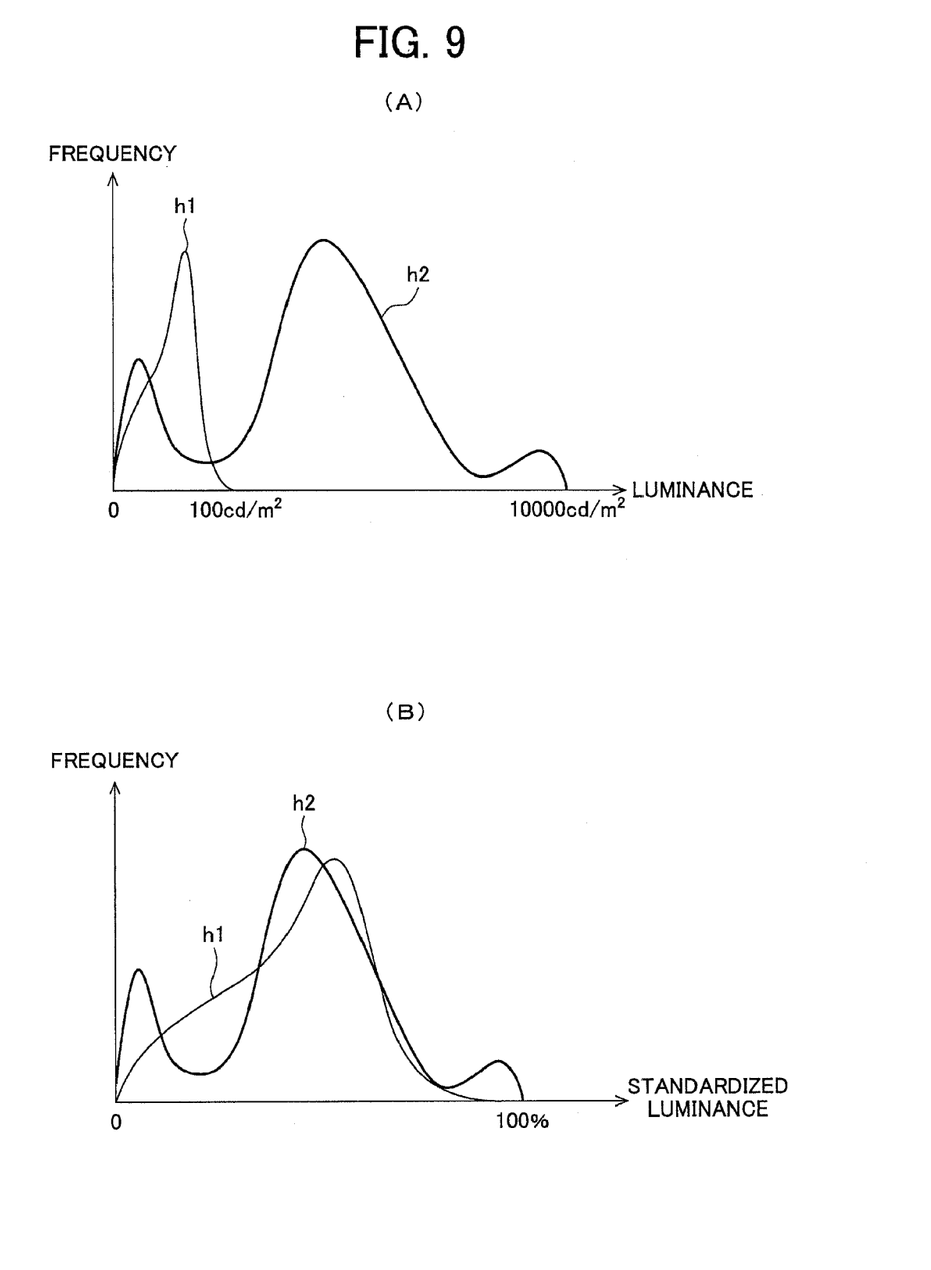
FIG. 9 is a diagram showing a histogram of a luminance and chromaticity of a real object or the like, and a histogram after standardization thereof.

For example, a luminance histogram of a real object or the like is shown in FIG. 9(A) while a histogram after standardization is shown in FIG. 9(B). In the diagrams, symbols 'h1' and 'h2' show luminance histograms in two scenes of the real world, in which h1 is a luminance histogram in a relatively dark scene while h2 is a luminance histogram in a relatively bright scene. In the example of FIG. 9(A), the luminance histogram of a real object or the like has brightness of 10,000 cd/m² at maximum on h1 and brightness of 100 cd/m² at maximum on h2. When the scene of the real world is made into data by imaging or the like, histogram data is standardized as shown in FIG. 9(B). Then, video signal data thereof has 255 tones in both cases with luminance of the object of 10,000 cd/m² and that of 100 cd/m². In other words, the luminance range is compressed, and thus original luminance information is lost.

Figure 10:
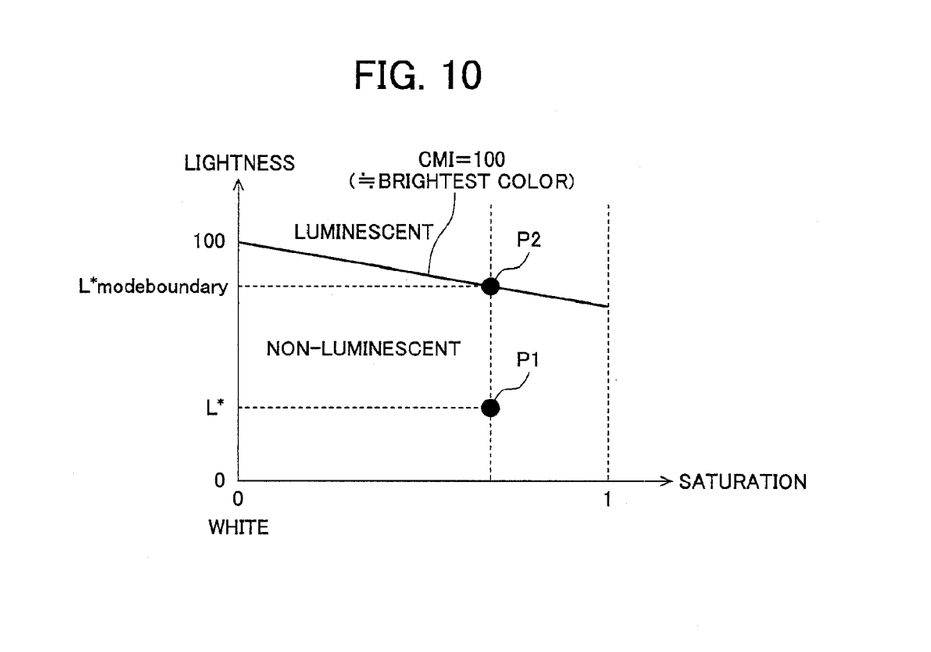
FIG. 10 is a diagram explaining a method of calculating CMI from a broadcast video signal to be displayed on the video display device.

Based on the above-described circumstances, description will be given for a method of calculating a CMI from a broadcast video signal to be displayed on the video display device with reference to FIG. 10. The broadcast video signal is standardized based on the BT.709 standard to be transmitted. Accordingly, first of all, RGB data of the broadcast video signal is converted into data of tristimulus values XYZ using a transformation matrix for the BT.709. Lightness $L*$ is then calculated from Y using transformation. It is assumed that $L*$ of a color of interest was at a position P1 in FIG. 10. Next, chromaticity is calculated from the converted XYZ to check $L*$ of the optimal color with chromaticity as with the color of interest ($L*$modeboundary) from data of the optimal color which is already known. A position thereof on FIG. 10 is P2.

The CMI is calculated from these values using the above-described formula (1). The CMI is indicated by a ratio between $L*$ of a pixel of interest and $L*$ of the optimal color of chromaticity thereof ($L*$modeboundary).

Figure 11:
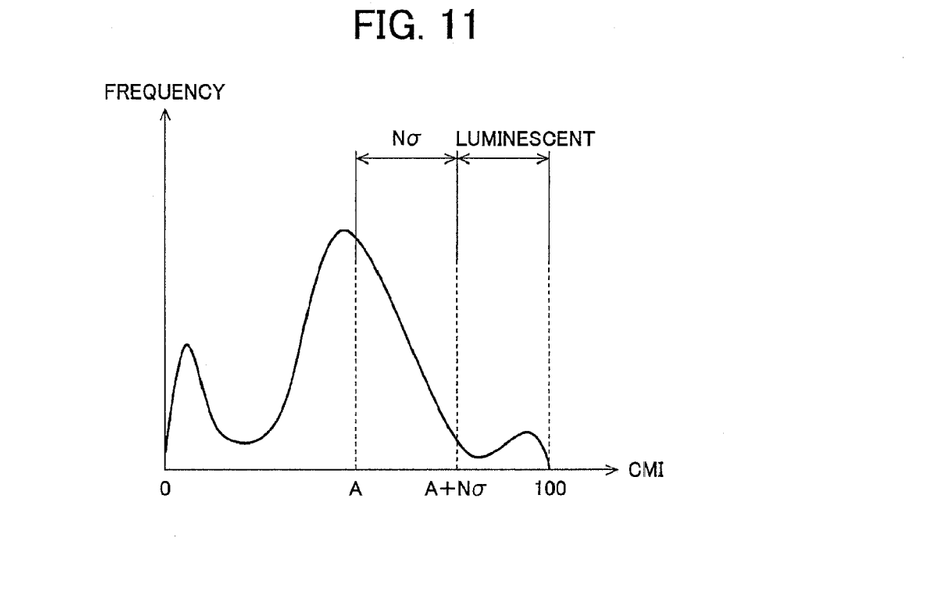
FIG. 11 is a diagram showing an example of a CMI histogram.

The CMI is obtained for each pixel of a video signal by the method as described above. The broadcast signal is standardized, and thus all pixels have any CMI in a range from 0 to 100. Then, a CMI histogram is created for a video of one frame with CMI on a horizontal axis and a frequency on a vertical axis. An example of the CMI histogram is shown in FIG. 11. An average A and a standard deviation σ are calculated from the created CMI histogram.

It is impossible to appropriately detect a pixel which is emitting light based on a certain absolute value calculated from the standardized video signal. Accordingly, whether or not light is emitted is distinguished with relative distribution of a video signal of one frame. Here, a strikingly bright pixel in the entire video of one frame is defined as a pixel which is emitting light. In this case, a CMI higher than the average A by Nσ (N is a prescribed constant) (A+Nσ) is defined as a luminescent color boundary, and a pixel having CMI which is greater than or equal to the luminescent color boundary is regarded as emitting light. A value of the constant N is not limited, however, N=2.8, for example.

By specific processing as described above, a CMI histogram is generated from a video signal, a 'thresh' is calculated from the histogram, and thereby making it possible to execute luminescent color enhancement processing as described above based on a geometric average value.

(Geometric Average Value Detection Processing)

Next, description will be given specifically for detection processing of a geometric average value which is used in the above-described luminescent color enhancement processing. The geometric average value (Geometric Average) is not an average of signal luminance but a luminance average value in which an average of luminance of a liquid crystal panel is calculated as a value that is coincident with a visual performance, and is specifically represented by the following formula (2).

[Formula I]

$$GeometricAve. = \exp\left(\frac{1}{n}\sum_{pixels}\log(\delta + Y_{lum})\right) \quad \text{formula (2)}$$

In the above-described formula (2), δ is a minute value which is not able to diverge calculation, and, for example, δ=0.00001. Additionally, Ylum indicates panel luminance, having a value of 0 to 1.0. The Ylum is allowed to be represented as (signal luminance/MAX luminance)^γ. Moreover, n indicates the number of pixels and "pixels" indicates the total number of pixels. In this way, in the formula (2), a logarithmic average of a luminance value of a pixel of a video is raised, in other words, a value of a geometric mean of luminance is indicated, and the value is greatly influenced by black.

Figure 12:
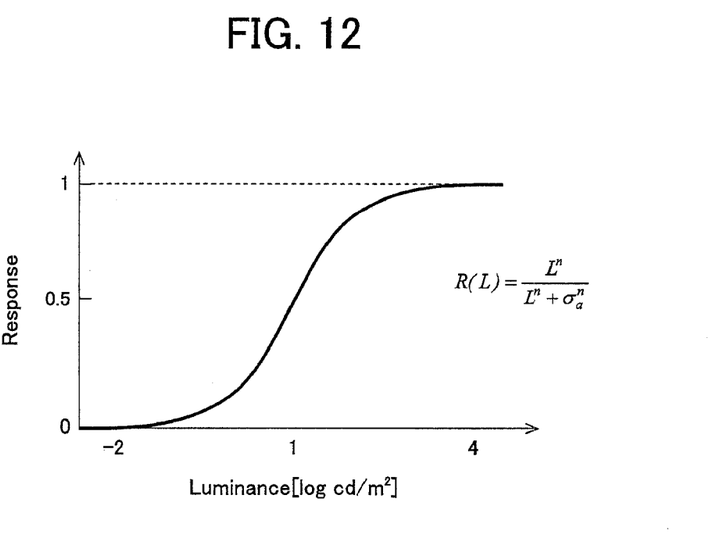
FIG. 12 is a diagram showing a response curve of a human photoreceptor cell with respect to luminance.

FIG. 12 is a diagram showing a response curve of a human photoreceptor cell with respect to luminance. As shown in FIG. 12, the response curve of a human photoreceptor cell depends on a luminance value having a logarithm (luminance (log cd/m²)). This is generally referred to as the Mickaelis-Menten Equation.

A geometric average value is obtained by raising a logarithmic average of a luminance value of a pixel as described above, and thus the geometric average value may be referred to as a value that response of eyes to an image (that is, how bright the image looks) is quantified. That is, it may be said that the geometric average value is close to a human sensory amount, and this value is used as a video feature value to determine in the CMI histogram whether or not luminescent color enhancement processing is performed.

Figure 13:
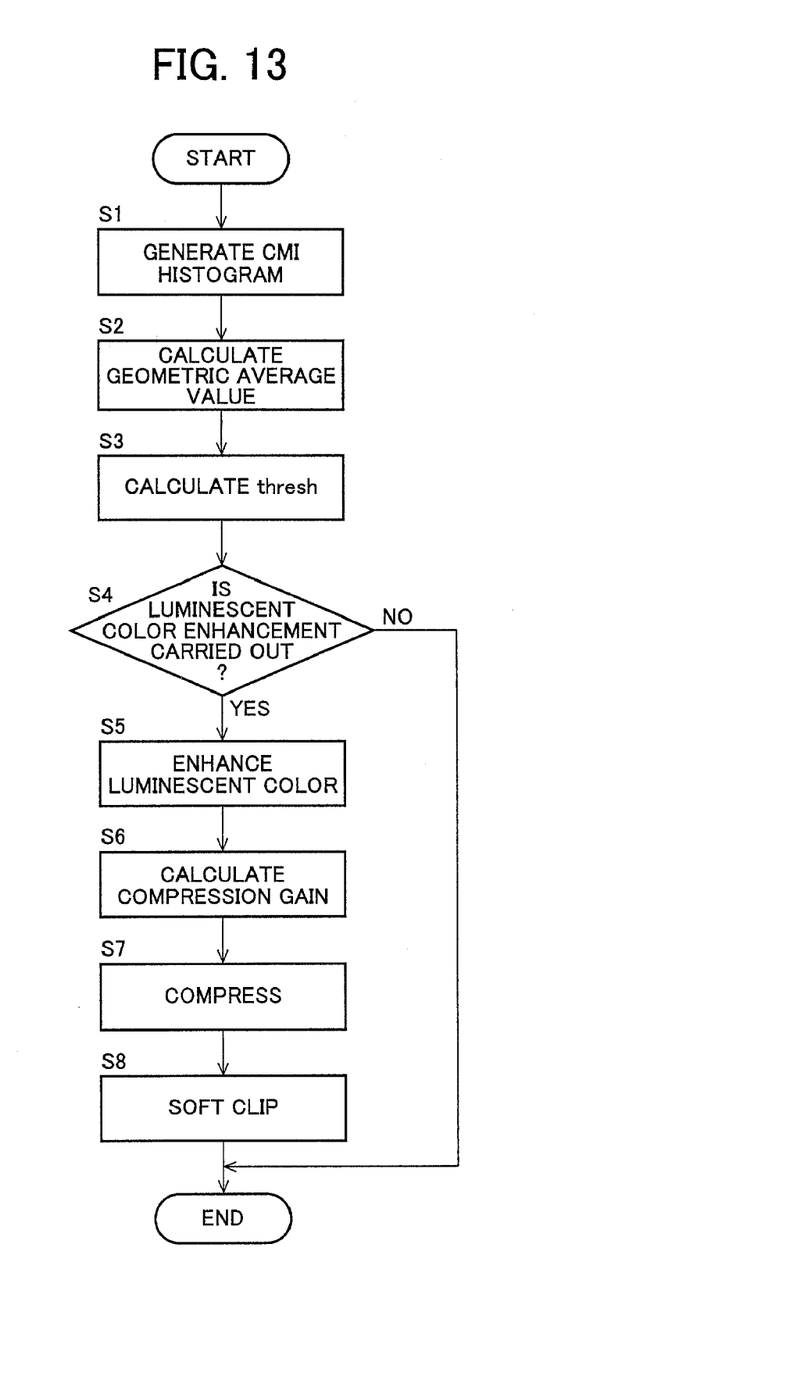
FIG. 13 is a flowchart for explaining luminescent color enhancement processing in a first embodiment of the video display device according to the present invention.

FIG. 13 is a flowchart for explaining luminescent color enhancement processing in a first embodiment of the video display device according to the present invention, showing a flow of luminescent color enhancement processing for one frame of a video signal.

First, a CMI histogram is created from an input video signal (step S1). The CMI histogram is obtained from a ratio between L* and L* of the optimal color (L:modeboundary) of each pixel. A geometric average value is then calculated from the CMI histogram (step S2). Subsequently, a 'thresh' for deciding a CMI region in which a luminescent color enhancement is carried out is calculated from the CMI histogram (step S3). The 'thresh' is calculated from an average value and a standard deviation of the histogram. An order of calculating the geometric average value and calculating the 'thresh' may be reversed.

Next, based on the calculated geometric average value, whether or not the luminescent color enhancement is carried out for the video of the frame is judged (step S4). When the video has a geometric average value which is greater than or equal to a prescribed level, the luminescent color enhancement is not carried out. In a case where the luminescent color enhancement is carried out, for example, by calculating gain such that a pixel at a 2% position from a maximum CMI of the histogram has CMI=100, and applying the gain to a pixel which is greater than or equal to the 'thresh', the luminescent color enhancement is carried out (step S5). With the luminescent color enhancement, a tone of a pixel regarded as a luminescent color is emphasized.

Next, compression gain is calculated (step S6). The compression gain is defined based on prescribed conditions to specify brightness of a screen and the like, or defined in relation to enhancing gain in advance. The calculated compression gain is then applied to the entire video to compress a tone (step S7). This compresses a tone of the entire video which is enhanced. Redistribution of luminance in a screen is performed from the enhancement to compression processing. That is, emphasis is further performed for a bright color part while a tone is lowered for a dark color part.

Finally, soft clip processing is performed (step S8). Here, soft clip is performed for a pixel exceeding a highest tone (255, for example) even after compression by using a quadratic function.

Second Embodiment

Next, description will be given for a second embodiment of the video display device according to the present invention. In the above-described first embodiment, the 'thresh' is calculated from the CMI histogram, and the luminescent color enhancement is carried out for the pixel which is greater than or equal to the 'thresh'. On the other hand, in the present embodiment, an operation is performed by using an RGB histogram or a Y histogram without using the CMI histogram. RGB data and luminance value Y data correspond to another example of a feature value of the present invention.

In the above-described first embodiment, the RGB data of the video signal is converted into XYZ by using a determinant to calculate chromaticity, and a CMI is obtained by a ratio between the chromaticity and L* of the optimal color. In this case, an operation amount for calculating the CMI is a considerable amount. While it may be said that the CMI is preferable for the luminescent color enhancement processing since the CMI is a feature value that is coincident with a human visual performance, in the second embodiment, the RGB histogram or the Y histogram is used in place of the CMI for the purpose of simplifying the operation amount.

The CMI is a value indicating how bright the color of the pixel of interest is, compared to the optimal color with chromaticity as with the pixel of interest as described above. On the other hand, in a combination of RGB, a case where two colors have same chromaticity is equal to that an RGB ratio is not changed. That is, processing of performing operation of the optimal color with same chromaticity in the CMI is processing of obtaining a combination of RGB when atone of RGB data becomes the greatest in a case where a ratio of RGB data is not changed and multiplied by a certain number.

Figure 14:
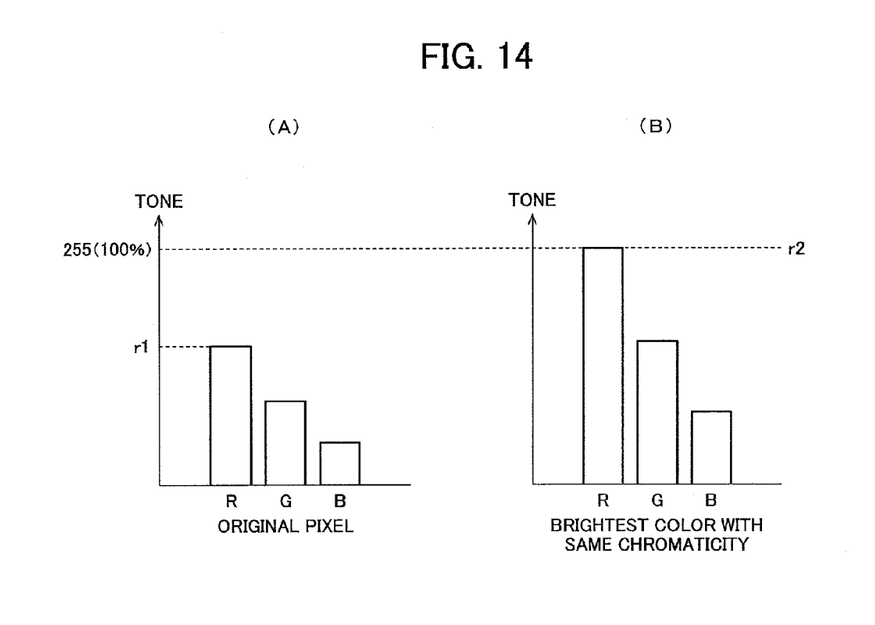
FIG. 14 is a diagram explaining an optimal color in a pixel having RGB data.

For example, a pixel having RGB data with a tone as shown in FIG. 14(A) is assumed to be a pixel of interest. When multiplying RGB data of the pixel of interest by a certain number, as shown in FIG. 14 (B), a color when any one of RGB is saturated first is the brightest color with chromaticity as with an original pixel. When a tone of the pixel of interest of the color which is saturated first (R in this case) is r1, and a tone of R of the optimal color is r2, a value similar to the CMI is allowed to be obtained by $$r1/r2 \times 100 \qquad \text{formula (3).}$$

A color which is saturated first when RGB is multiplied by a certain number is a color having the greatest tone among RGB of the pixel of interest.

In the present embodiment, a value by the formula (3) as described above is calculated for each pixel to create a histogram. With this histogram, processing as with the CMI histogram in the first embodiment is performed. That is, an average value and a standard deviation are calculated from the histogram by the formula (3) to decide a 'thresh'. Then, a geometric average value is calculated from the histogram to enhance a pixel corresponding to data which is greater than the 'thresh' according to the level of the geometric average value to be compressed thereafter. By such processing, it is possible to reduce a burden of the operation more than the operation processing of the CMI, and to perform processing by, for example, a general-purpose IC or the like, and thus simplification is performed on a circuit scale.

Further, in the case of focusing only on brightness of a pixel, it is possible to extract a luminance Y signal from a video signal, calculate a ratio between luminance of a pixel of interest and the maximum luminance to create a similar histogram, and perform enhancement processing by processing similar to the above-described processing. However, the Y histogram, with no information related to color, is inconsistent with the above-described processing by the CMI or the RGB histogram. Note that, in processing of creating the Y histogram to carry out an enhancement, effective enhancement processing is possible with a simple configuration without raising a major obstacle.

Note that, in the above-described embodiment, the histogram is created based on the feature value of the video signal and the enhancement is carried out by video signal processing for a pixel of the top of a prescribed range thereof, however, in performing the enhancement processing, a backlight light source for illuminating a liquid crystal panel may be controlled to control brightness on a display screen.

In this case, for example, in uniformly decreasing gain over the entire pixels of one frame, in addition to applying the compression gain to the video signal, luminance of the backlight may be uniformly reduced to lower screen luminance. At the time, the compression gain of the video signal and the backlight may work in concert to realize lowering of luminance as desired.

EXPLANATIONS OF LETTERS OR NUMERALS

1 . . . video signal processing portion; 2 . . . histogram generation portion; 3 . . . enhancement processing portion; and 4 . . . compression gain processing portion.

The invention claimed is:

1. A video display device for enhancing and displaying an input video signal based on a feature value of the input video signal, comprising:
   a histogram generation portion for generating a histogram of the feature value of the input video signal;
   an enhancement processing portion for regarding a top region in a prescribed range of the histogram generated by the histogram generation portion as a luminescent color and enhancing a pixel value of the luminescent color; and
   a compression gain processing portion for uniformly decreasing gain over the entire pixels of one frame subjected to enhancement processing after the enhancement processing portion performs the enhancement processing, wherein
   the histogram generation portion calculates, for each pixel of one frame of an input video signal, the feature value of a pixel and a possible maximum of the feature value of the pixel, calculates, for each pixel, a ratio of the feature value of the pixel to the maximum of the feature value as an index value of color brightness, and generates a histogram in which the number of pixels is integrated according to the index value,
   the enhancement processing portion regards a pixel in which the index value in the histogram generated by the histogram generation portion is greater than or equal to a prescribed threshold as the top region and carries out an enhancement by giving gain-up for a pixel value in the top region,
   the enhancement processing portion integrates, at the time of enhancing the pixel which is greater than or equal to the threshold, the number of pixels from a pixel having a highest feature value in a direction of low feature value of the histogram, applies gain-up in which the M-th (M is a prescribed value) percentile pixel of the total number of pixels is displayed in a displayable highest tone, and temporarily permits that the pixel value exceeds the displayable highest tone by the applied gain-up, and
   the compression gain processing portion performs, in a case where the pixel value exceeds the displayable highest tone even after the compression gain processing portion applies gain-down for the temporarily permitted pixel value, soft clip so that the pixel exceeding the highest tone is output in a tone within the highest tone as well as that an output value in a region from the highest tone up to a prescribed low tone gradually lowers in a curve.

2. The video display device as defined in claim 1, wherein the enhancement processing portion determines, the threshold 'thresh' by 'thresh'=$A+N\sigma$ ($N$ is a constant)

where the prescribed threshold is a 'thresh', an average value of the index value of the histogram is A, and a standard deviation is $\sigma$.

3. The video display device as defined in claim 1, wherein the enhancement processing portion exponentiates a logarithmic average of a luminance value of a pixel of one frame of an input video signal to calculate a geometric average value, and carries out the enhancement by the gain-up in a case where the calculated geometric average value is lower than a prescribed value.

4. The video display device as defined in claim 3, wherein the enhancement processing portion sets a second prescribed value which is lower than the prescribed value of the geometric average value, gradually increases gain which is applied as the enhancement in order from the prescribed value up to the second prescribed value in a region from the prescribed value to the second prescribed value, and keeps the gain constant in a region where the geometric average value is lower than the second prescribed value.

5. The video display device as defined in claim 1, wherein the feature value of the pixel is luminance L* which is specified by CIELAB color space.

6. The video display device as defined in claim 1, wherein the feature value of the pixel is data including a maximum tone value among pixel RGB data.

7. The video display device as defined in claim 1, wherein the feature value of the pixel is a luminance value Y of a pixel.

* * * * *